United States Patent [19]

Ehrlich et al.

[11] Patent Number: 4,497,842
[45] Date of Patent: Feb. 5, 1985

[54] BEVERAGES OBTAINED FROM ALCOHOLIC TREATMENT OF ROASTED CITRUS FRUIT PEELS

[76] Inventors: Joseph R. Ehrlich, 1793 Riverside Dr., New York, N.Y. 10034; Hildegard Hess, 2730 Bennett Ave., New York, N.Y. 10040

[21] Appl. No.: 471,820

[22] Filed: Mar. 3, 1983

Related U.S. Application Data

[63] Continuation of Ser. No. 340,327, Jan. 18, 1982, abandoned.

[51] Int. Cl.³ .............................................. C12G 3/00
[52] U.S. Cl. .................................. 426/592; 426/596; 426/429
[58] Field of Search ....................... 426/429, 592, 596

[56] References Cited

U.S. PATENT DOCUMENTS 1,257,451  2/1918  Bjercke ................................ 426/596

FOREIGN PATENT DOCUMENTS 863115  of 1941  France ................................ 426/596
378753  of 1940  Italy ................................... 426/596
   751  of 1881  United Kingdom ................ 426/596
  2168  of 1894  United Kingdom ................ 426/596

OTHER PUBLICATIONS

Package Label, "Percolator Grind Mild Roast Imitation Coffee, C. C. Granger Co., Henderson, N.C.
Herstein et al., Chemistry and Technology of Wines and Liquors, 2nd Ed., 1948, Van Nostrand Co.: New York, pp. 249-250.
Grossman, Grossman's Guide of Wines, Beer and Spirits, 6th Ed., 1977, Charles Scribner's Sons: New York, p. 367.

*Primary Examiner*—Joseph Golian
*Attorney, Agent, or Firm*—Jacobs & Jacobs

[57] ABSTRACT

A method of preparing roasted citrus fruit peel which comprises extracting the roasted peel with aqueous ethanol, removing the aqueous ethanol from the peel and roasting the thus treated peel. The aqueous ethanol may be recovered for use as an alcoholic beverage. The treated peel is useful in preparing a substitute for coffee or tea by extracting the treated peel with water.

6 Claims, 1 Drawing Figure

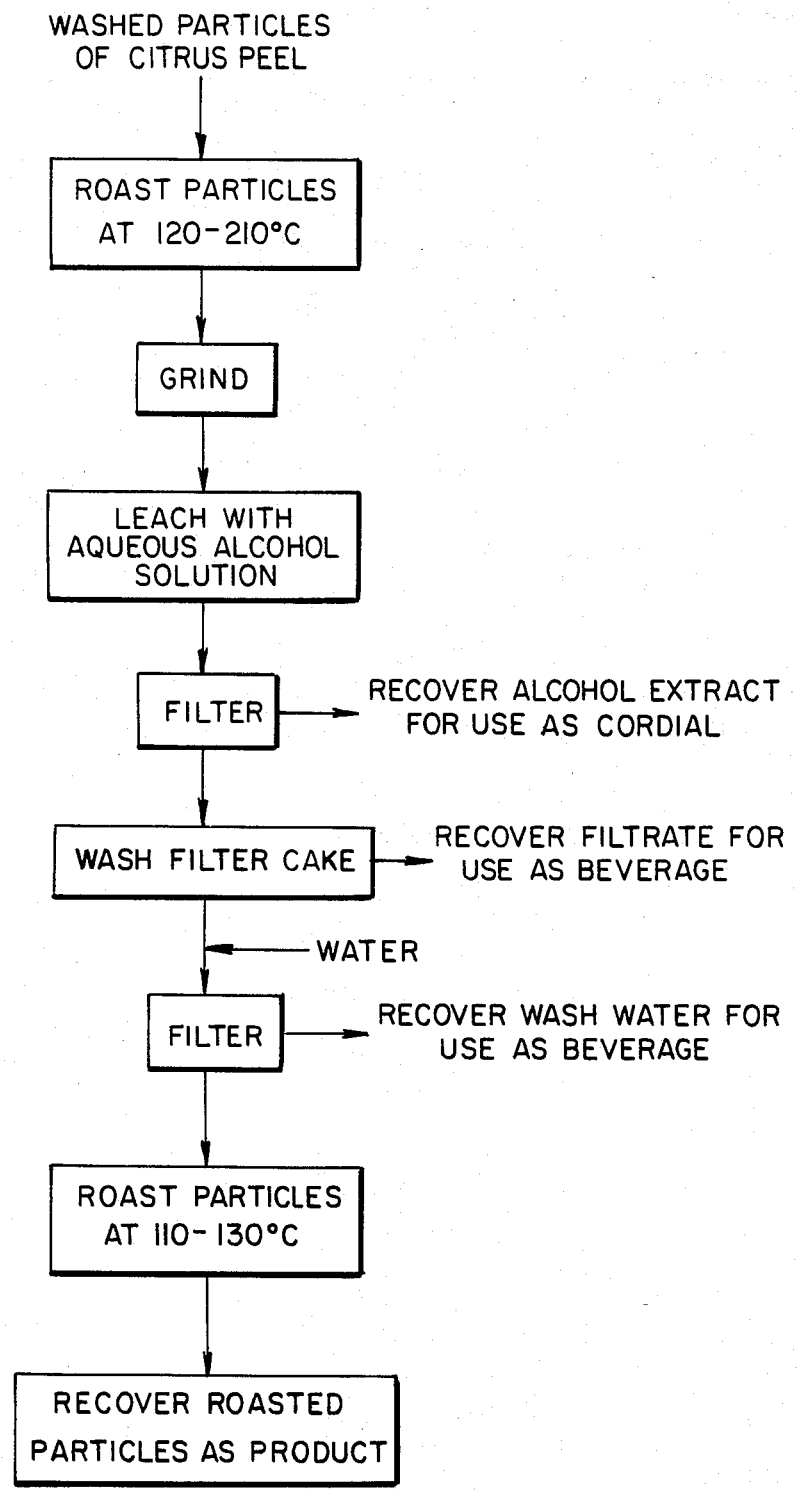

BEVERAGES OBTAINED FROM ALCOHOLIC TREATMENT OF ROASTED CITRUS FRUIT PEELS

CROSS-REFERENCE

This is a continuation of Ser. No. 340,327 filed Jan. 18, 1982 now abandoned.

This invention relates to the preparation of beverages derived from the roasted peel of citrus fruit, such as orange, grapefruit, lemon, tangerine and lime.

It has been previously proposed to use roasted citrus peel as a breakfast beverage that does not contain caffeine as do coffee and tea. According to these prior proposals, citrus peel comprising the outer colored rind and the inner white meat of the rind eventually also the skin below the rind is comminuted and then roasted at various temperatures from 100° C.–200° C. and the roasted particles are being treated with hot water to yield a warm drink.

U.S. Pat. No. 1,257,151 describes a process whereby pieces of washed citrus rind are first subjected to a temperature of 180° C. and afterwards to a temperature of about 215° C. The roasted material is ground or pulverized and yields with hot water a "coffee or tea-like" beverage.

Italian Pat. No. 378,753 describes the process of comminuting and drying the peels and/or pulp of oranges until water-free and then roasting the material at a constant temperature until it has brown color. The hot water extract of that product is used as a beverage.

British Pat. No. 2,168 describes a mixture of dried fruit, such as apples, pears, raisins etc., with dried rinds of citrus fruit to be ground into a powder, which is mixed into a dough with citrus and other fruit juices, which is then baked, afterwards broken up and mixed with berries, then again dried and roasted. This preparation is used as food or for brewing a beverage.

French Pat. No. 863,115 describes a roasted mixture of chick-peas, carob beans and black licorice with 1% orange peels.

British Provisional Specification No. 751 proposed the use of vegetable roots which are comminuted and roasted. Fruits such as apples, pears, figs, grapes, nuts, oranges (not peels), bananas, bark of trees etc. and the roasted roots are mixed with the roasted fruits and ground to a powder. Presumably, the powder is used to form an aqueous extract.

Roasted citrus peels yield, with hot water, an extract which varies in color from tea brown to coffee brown, whereas the cold water extract has a very light color. The taste of the hot water extract exhibits bitterness in various degrees. The citrus rind contains among others, the glycoside hesperidin, which is said to be responsible for that bitter taste. The aqueous extracts on the whole are indeed very pleasant beverages. However, their quality is quite variable and depends to a great deal on the quality of the raw material, which is a natural product. Accordingly, it is difficult, if not impossible, in regular production to obtain a reasonably uniform product.

Most of all, the bitterness of the product varies from batch to batch, from very bitter to almost not bitter at all. There is nothing that could be done about it, except grading the batches according to their aroma and flavor of their water extracts and then carefully blending in proper amounts the various grades for obtaining more or less a "uniform" product. Of course, this does not guarantee a uniform product in general, but allows for a certain uniformity among the various batches which are available at a given time. Such process is technically clumsy and not always feasible.

It is one objective of this invention to achieve uniformity of the finished product derived from non-uniform raw-material by a manufacturing process rather than by grading.

Another objective is to remove the bitterness of the roasted product and to obtain an overall improved, ameliorated beverage.

We have found that water at room temperature extracts the aromatic and coloring matter found in roasted citrus peel very slowly. It takes days before cold water dissolves those products which hot water dissolves in minutes. Cold water, after having been in contact with deep brown roasted citrus peel particles for several hours is slightly yellow in color and has little flavor while the same type roasted material yields a deep brown, strongly flavored aromatic solution with hot water in 1 to 2 minutes.

The same type of roasted citrus peel particles, when treated with 90 to 100% ethyl alcohol, yields at room temperature a yellow solution rather similar in color to a cold water solution but with a considerably stronger flavor than the cold water extract. When some water is added to that clear alcohol solution, a white precipitate appears immediately, said precipitate being microscopic droplets which pass through a Whatman filter No. 1. The taste of the pure alcohol solution is not bitter.

The basis for the present invention is our discovery that when ethyl alcohol is mixed with water, such as about 1 part alcohol with 1 to 2 parts water, e.g. 40 parts alcohol and 60 parts of water, all parts by weight, and this mixture, at a temperature below about 100° F., is poured over the roasted citrus peel particles, the solution immediately becomes deep brown. Preferably, the aqueous ethanol used to leach the particles is at a temperature of from about 40° to about 80° F. Indeed, the leaching of the particles can be carried out at ambient temperature.

The dark solution obtained from the leaching can be separated from the particles by filtration. This solution is clear. The flavor of this alcohol-water extract is highly aromatic and tastes like an excellent cordial except for the fact that it is bitter. By addition of sufficient fructose, however, this bitterness can be overcome and then this extract is indeed a perfect cordial. For example, from 5 to 50 parts or more of fructose per part of cordial can be used, depending upon taste.

The separation of the roasted granules from the alcoholic-aqueous liquid is preferably made in a filter press. The pressed cake is still slightly moist from the water and alcohol. The moist cake is then washed with cold water and again pressed in the filter press. The recovered wash water contains a small amount of alcohol, usually about 0.2 to 4%, depending upon how much water is used in the washing. The color of the recovered wash water is yellow to brown, depending upon the time of contact between the wash water and the filter cake, and its taste is pleasant, either not bitter at all or at most only slightly bitter. If necessary, a filter aid, such as diatomaceous earth may be used to clarify the recovered wash water. When the recovered wash water is sweetened with sugar or sweetener added, the wash water makes a delicious cold soft drink, especially when carbonated. The recovered wash water can be boiled or pasteurized without losing its flavor, in which case it no longer contains alcohol.

The water-washed granules are then subjected to a light roasting. The peel particles after the second roasting are now lighter in color than after the first roasting, having lost some of their coloring matter during the alcohol-water treatment. The hot water extract of the twice roasted granules shows that the bitterness and sometime harshness found in certain batches has gone with this treatment. The result is a pleasant, mellow drink with or without sweetener and/or milk, cream, etc.

Instead of treating the roasted citrus peels after the first roasting with an alcohol-water blend, one can also use an distilled alcoholic beverage of about 70 to about 120 proof, such as brandy, whiskey, vodka, gin etc, which is just the proper alcohol water ratio to dissolve those components which have to be removed from the roasted peel to provide the desirable conditioning of the final roasted product. All these liquors, whether they are colorless or colored, turn immediately deep brown when the contact with the roasted granules and change to delicious, strong cordials of different flavors. Since they dissolve the bitter portion of the roasted peels, the addition of sweetening material is indicated. Fructose is the sweetener of choice for this purpose, as fructose among all sugars has the best solubility in alcohol.

The process of the present invention is illustrated in terms of a preferred embodiment in the drawing, which shows a flow sheet for the process of our invention.

Referring to the drawing, one carries out the process of the invention as follows.

Cut the citrus peel with the white inner layer into small pieces, wash them with cold water, shred them to a particle size of about 2–4 mm. and roast them in the presence or absence of air until they look dark brown. The particles are kept moving during roasting. A suitable temperature range is from 120° to 210° C.

While the whole citrus fruit can be cut and roasted, usually the fruit will be preliminarily processed to remove most or all of the juice and pits. Mechanical removal of the juice before roasting will shorten the roasting process, since there will be no need to evaporate the juice during the roasting. Hence, it is preferred to press the fruit to remove most or all of the juice before roasting. It is also preferred to remove the pits before roasting, since the pits make no useful contribution to the beverage of the invention. Where fruit is processed for its juice, the de-juiced fruit comprising peel, pulp etc., may be an economical source of raw material to use in the invention.

When the whole fruit is to be used, a suitable procedure is to place the washed fruit into a colloid mill or blender and reduce the entire fruit to a mass from which the juice can be separated by pressing, filtering, centrifuging etc. The moist material remaining is preferably dried before roasting. After the juice has been removed, the remaining part of the fruit has a rather high percentage of peel.

In order to produce the purest grade of the beverage of the present invention, it is preferred that only the clean peel or rind with its inner integral, often fleshy, white layer is used as material to be roasted. When using only the peel of the fruit to make the beverage of the invention, the peel is preferably shredded into small particles. Any powerful shredder can easily take care of pieces of the hull which might be attached to the peel. The hull is tolerable as far as the quality of the beverage is concerned, but can be removed. If the shredder cannot comminute the tough hull, the hull is removed beforehand.

The peel particles are usually from about 1 mm to about 8 mm average particle size. The particles can also be larger, since many of them disintegrate to smaller size during the roasting process. If necessary, grinding and screening procedures after the roasting, can be used to give small particles of uniform size. Small particles yield a stronger extract much faster than large particles. Usually, the roasted particles will be less than about 10 mm, preferably less than about 5 mm, in size. The peel is used with or without the pulp or skin, but always with its inner, integral, white layer, and the thicker the inner layer is, the better the quality of the beverage.

After the roasted particles have cooled down to room temperature, grind them to a smaller size and leach them at room temperature with a mixture of about 35 to about 75 parts, preferably about 30 to about 60 parts of ethyl alcohol and about 75 to about 35 parts, preferably about 70 to about 40 parts, of water. Use about 4 to about 6 parts of solvent mixture for each part of roasted peels, while keeping the particles in movement.

The alcohol-water blend has an extremely fast solubilizing action, extracting a sizeable amount of color and some of the aromatic components even faster than boiling water does. Depending on the quantity and quality of the roasted peel and the efficiency of the equipment, a treatment may last from one to several minutes. Such relatively short treatment is sufficient to remove undesirable bitterness from the granules while leaving most of the flavor in the final product. Instead of using an ethyl alcohol-water blend, any liquor of any taste which is approximately 70 to 120 proof can be used as the source of ethanol.

The roasted granules are separated from the aqueous ethanol solution by filtration, e.g. in a filter press.

The alcoholic filtrate from the first filtration is a useful by-product. It may be sweetened, if desired, and used as a cordial.

The wet cake in the filter press is washed with cold water to remove and recover whatever little alcohol is left in the moist cake. This may be done by directly adding a total of about 15 to about 50 parts or more of water per 100 part of granules in several portions in succession. One can also disperse the filter cake with agitation in less water to obtain a slightly more concentrated wash solution as this wash solution represents another by product. As previously described, it contains a small amount of alcohol.

The water-washed roasted peel granules are dispersed in water and are again filtered, e.g. in a filter press.

The particles obtained from the second filtration are roasted for a short period between 110° C.–130° C. until dry and hard.

The granules treated as thus described exhibit a remarkable uniformity and yield beverages with hot water which have been considered to be by far superior as compared with untreated material by a great majority of people who tried both.

One method for brewing the beverage from the processed particles is by filling the particles in "tea bags" and pouring hot water over them. A bag containing 2.5 to 3.0 grams of particles yields about two cups of beverage. Any paper or fabric that will allow water to extract the beverage from the roasted peel particles can be used for the bag; conventional "tea bag" material is acceptable. Any method used for brewing coffee or tea may also be used but a long percolating might yield a very strong extract overpowering the delicate fragrance and aroma one can enjoy by using the "tea bag" extract.

The beverage of the invention can be further processed by lyophilization, e.g. freeze-drying, or other known methods to produce an "instant soluble" powder. The beverage can be carbonated, sweetened, canned, bottled or iced, as conventional beverages.

The caffeine-free beverage of the invention will appeal to the millions of people who go to the many thousands of so-called "health" restaurants and "health" stores and millions of other people who do not like de-caffeinated coffee and/or want to avoid regular coffee or tea for all kinds of health reasons. The by-products of this process might also be found enjoyable by cordial lovers and soft drink consumers.

The present invention is illustrated in terms of its preferred embodiments in the following Examples.

EXAMPLE 1

1440 grams of orange peel and 1443 grams of grapefruit peel were washed, comminuted and mixed together to give 2,883 grams of raw peel, which was roasted at a temperature between 140° C.-160° C. until the particles were brown and hard. The roasted material was ground to a smaller particle size and weighed 620 grams.

The 620 grams of roasted particles were leached for two minutes with 2,480 grams of a mixture consisting of 40% ethyl alcohol (99%) and 60% tap water, followed by filtration under pressure. The filtrate was deep brown and weighed 1960 grams (Filtrate I). The wet cake was dispersed and washed in successive portions of water, using a total of 19,840 grams water, which is 32 times the weight of the roasted granules. The wash water was recovered as Filtrate II. The washed particles were filtered under pressure until no more liquid passed through the filter.

The wet filter cake weighed 1,317 grams and was subjected to a second roasting at a temperature of about 130° C., until dry. The particles were hard and brown but slightly less brown than after the first roast. Two cups of a very pleasant, tea-colored beverage were brewed with hot water in one to two minutes from a tea bag containing 2.7 grams of the final product. When the tea bag stays in the hot water longer than this, a darker and more aromatic drink is obtained. With sugar or sweetener or milk or both, this beverage had a delicious taste of its own. There was no bitterness left, even though the untreated material from the first roast yielded a beverage with a bitter taste or an after-taste. This beverage made from the final product also tasted pleasant when cold.

Filtrate I was again filtered and the recovered liquid was sweetened. Depending upon its bitterness, from 5 to 14 parts of fructose are added to 100 parts of liquid, all parts by weight. This sweetened liquid is a delicious cordial.

Filtrate II, the wash water, has a light brown color. After clarification by a second filtering, 7-12 parts of sugar, depending on the desired sweetness or an equivalent of sweetener, may be added to 100 parts of liquid. Filtrates I and II contain a considerable amount of bitterness extracted from the first roast. The wash water contained 1.3% alcohol. Filtrate II was boiled for 5 minutes without any loss of flavor or aroma. Cooled and especially when carbonated, this Filtrate II is a delicious "soft" drink. After boiling, there was no more alcohol left. If one wishes to obtain an even more aromatic Filtrate II, also containing more alcohol, one can use less "wash water", e.g. 15 or 25 times the amount of roasted material. Likewise, using more wash water, e.g. 45-50 times the amount of roast one can still obtain a very nice cold drink and bring down the alcohol content to about 0.2-0.5%.

EXAMPLE 2

1200 grams of orange peel and 1200 grams of grapefruit peel were washed, comminuted, mixed and roasted, as in Example 1 to yield 523 grams, which were leached with 2100 grams of 100 proof vodka at room temperature for one minute. The filtration and washing was carried out as in Example 1. Filtrate I (vodka extract) weighed 1617 grams. The total wash water was 19,350 grams, 37 times the amount of the roasted granules. The wet filter cake weighed 1140 grams and was roasted as in Example 1 to yield 413 grams of final beverage material product. The recovered wash water (Filtrate II) contained 1.35% alcohol.

Filtrate I tasted excellent but different from Filtrate I of Example 1. Filtrate II and a hot water extract of 2.7 grams of final product were similar in taste as in Example 1.

EXAMPLE 3

To demonstrate the effect of leaching the once-roasted particles with alcohol followed by a second roasting, a portion of the washed and roasted peel prepared according to Example 1 were set aside and not subjected to the leaching, second roasting and further processing of Example 1. Beverages were made from the washed and roasted particles and from the particles of the invention, which were further processed as in Example 1, by forming hot water extracts as described in Example 1. Samples of each beverage were presented to a panel of 48 people ranging in age from young to elderly. The samples were not identified as to source, and were described as decaffeinated tea.

The panel was instructed to taste each sample of tea and to express their preference. Seventy-seven percent of the panel preferred the beverage prepared according to the present invention because it was more "mellow" in comparison with the beverage prepared from the once-roasted particles, and 23% observed that there was more "tang" or flavor in the beverage prepared from the once-roasted particles. Of the 23% who expressed a preference for the comparison beverage, some observed that they prefer strong, percolated coffee and never drink instant coffee or decaffeinated coffee.

What is claimed:
1. A method of making a beverage product, which comprises:
   a. roasting citrus fruit peel particles at a temperature of from about 120° to about 210° C.;
   b. admixing from about 4 to about 6 parts by weight of aqueous ethanol per part by weight of said roasted particles for up to several minutes, said aqueous ethanol comprising from about 30 to about 75 parts by weight of ethanol and about 75 to about 35 parts by weight of water;
   c. separating said particles from the mixture of particles and liquid obtained from step (b);
   d. washing said separated particles with at least 15 parts by weight of water per part by weight of said particles; and e. collecting spent wash water recovered from step (d) as a beverage.

2. The method according to claim 1, wherein said aqueous ethanol is a distilled alcoholic beverage of about 70 to about 120 proof.

3. The method according to claim 1, wherein said roasted particles are admixed with said aqueous ethanol for from one to several minutes.

4. The method according to claim 1, wherein step (c) is carried out by filtering said particles in a filter press and recovering a wet filter cake, and step (d) is carried out by washing said wet filter cake with said water.

5. The method according to claim 1, wherein the amount of water used in step (d) is about 15 to about 50 parts by weight per part by weight of said particles.

6. A beverage obtained by the method of claim 1.

* * * * *